United States Patent [19]

Gilbert

[11] 4,292,845
[45] Oct. 6, 1981

[54] CONNECTION ASSEMBLY FOR RIGID STEM DIAL GAUGE

[76] Inventor: John J. Gilbert, 98 W. Park Dr., Porthcawl, Mid Glamorgan, Wales

[21] Appl. No.: 92,474

[22] Filed: Nov. 8, 1969

[30] Foreign Application Priority Data

Nov. 23, 1978 [GB] United Kingdom ............. 45732/78

[51] Int. Cl.³ .............................................. G01K 5/50
[52] U.S. Cl. ................... 73/362.1; 285/282; 403/127
[58] Field of Search ............. 73/431, 362.1, 322.2; 64/2 R, DIG. 2; 285/282

[56] References Cited

U.S. PATENT DOCUMENTS

| 471,523 | 3/1892 | McElroy | 73/362.1 X |
| 1,904,615 | 4/1933 | Bristol et al. | 73/431 |
| 2,524,894 | 10/1950 | Dobrin | 73/375 |
| 2,925,734 | 2/1960 | Gorgens | 73/431 |
| 3,472,045 | 10/1969 | Nelsen et al. | 64/2 X |
| 3,797,315 | 3/1974 | Halpern | 73/362.1 |

FOREIGN PATENT DOCUMENTS

| 232421 | 5/1944 | Fed. Rep. of Germany | 73/431 R |
| 206050 | 4/1959 | Fed. Rep. of Germany | 64/DIG. 2 |
| 110474 | 10/1917 | United Kingdom | 73/431 R |

Primary Examiner—Daniel M. Yasich
Attorney, Agent, or Firm—Henry R. Lerner

[57] ABSTRACT

A rigid stem dial gauge, such as a thermometer has an assembly which connects the thermometer stem to the pointer shaft and permits the two parts to be disposed at a range of angles to each other. The assembly comprises a pair of cylindrical housings, one mounted coaxially and rotatably within the other, the inner housing being connected to the thermometer stem shaft of the gauge and the outer housing being connected to the pointer shaft. The stem and the shaft are interconnected by a flexible drive accommodated within the housings.

3 Claims, 2 Drawing Figures

U.S. Patent  Oct. 6, 1981  4,292,845
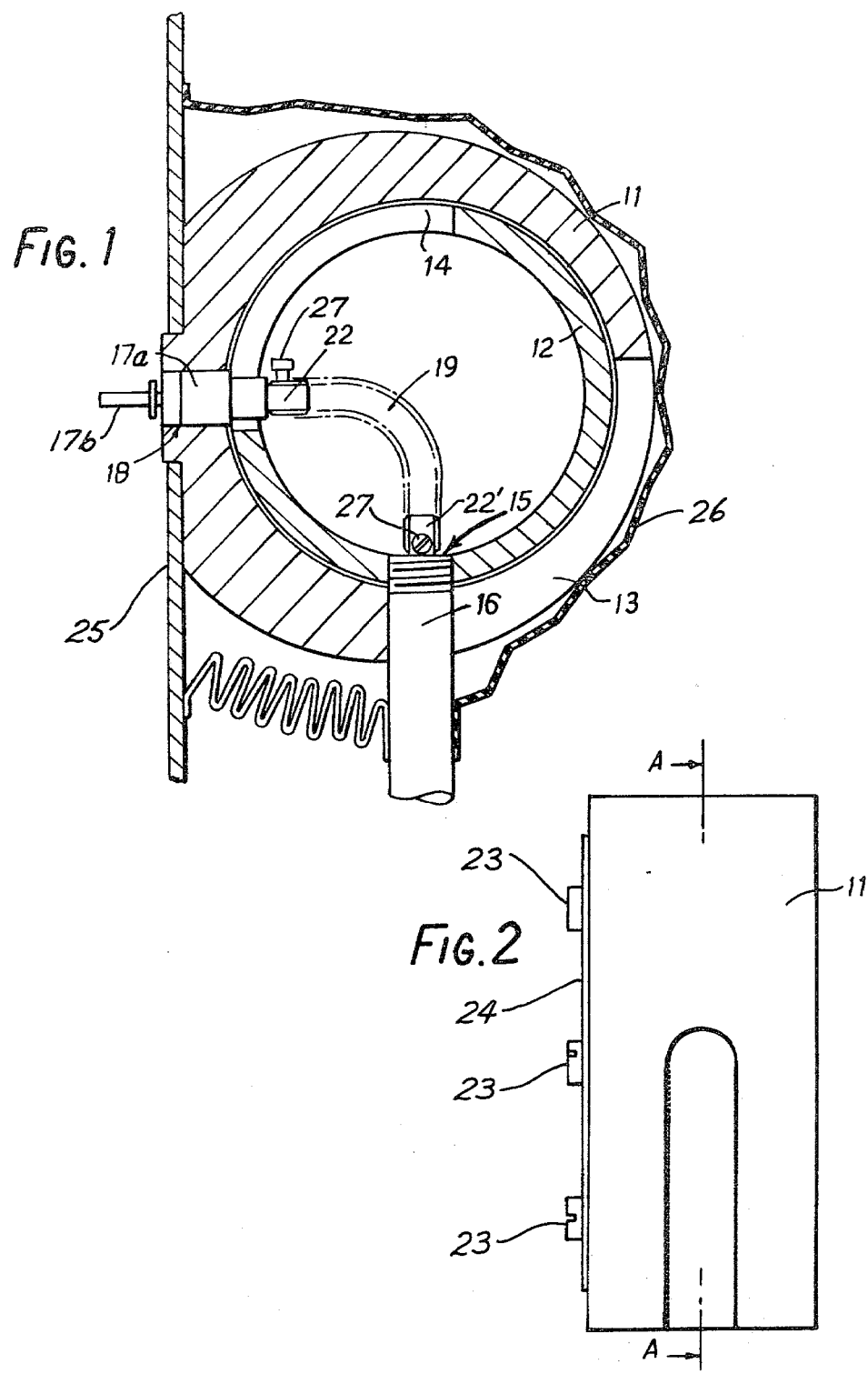

CONNECTION ASSEMBLY FOR RIGID STEM DIAL GAUGE

The present invention relates to gauges, such as thermometers and, in particular, to a connection assembly for rigid stem, dial gauges.

The invention can be embodied in a variety of sensing instruments, e.g., liquid-filled, gas-filled, mercury-in-steel, vapour pressure, liquid expansion and pressure gauges, in addition to thermometers.

Problems are sometimes encountered in siting rigid stem thermometers, particularly bi-metal thermometers, if pipe work or other obstructions prevent the use of normal vertical or coaxial thermometers.

It is an object of the present invention to provide an assembly for connecting a thermometer stem and a pointer shaft for a dial gauge which enables the thermometer stem to be disposed at a range of angles with respect to the head.

According to the present invention there is provided an assembly for connecting a thermometer stem and pointer shaft for a gauge comprising two cylindrical housings, one mounted coaxially and rotatable within the other, the inner housing accommodating a flexible drive which extends between a fixed point on the cylindrical surface of the inner housing at which means are provided for connecting the drive to a thermometer stem and a fixed point on the cylindrical surface of the outer housing at which means are provided for connecting the drive to the pointer shaft, each housing having an arcuate slot in its cylindrical surface through which the flexible drive passes and which enables the position of the two fixed points to be varied relative to each other.

Preferably, the assembly includes a flexible cover of rubber or plastics material which surrounds the two housings to prevent the ingress of dirt or moisture.

The invention will now be described by way of example, with reference to the accompanying drawings, in which:

FIG. 1 is a vertical section through part of a thermometer assembly embodying the invention and taken on the line A—A in FIG. 2, and FIG. 2 is an end-on elevation of the thermometer assembly with the protective bellows and stems and dial omitted.

The assembly comprises two cylindrical housings 11 and 12, the housing 12 being mounted coaxially inside the housing 11, with the inner surface of the latter in sliding contact with the outer surface of the former. The housing 12 is rotatable within the housing 11 about their common axis. The housings 11 and 12 each have a slot 13 and 14 respectively in their cylindrical surfaces that extends around a cylindrical arc subtending an angle of just more than 90° at the axis of the cylinder.

Attached to the inner housing 12, as at 15, is a fixed tubular member 16 within which there is disposed a rotatable stem of a thermometer, and attached to the outer housing 11, as at 18, is a fixed tubular member 17a having an inner rotatable pointer shaft 17b. The pointer shaft 17b extends through slot 14 and is connected, by means of brass bush 22, to one end of a helically wound spring 19 which defines a flexible drive accommodated within inner housing 12. The other end of spring 19 is connected, by means of another brass bush 22', to said rotatable thermometer stem which extends through slot 13. Thus it is seen that the pointer shaft 17b is connected to the thermometer stem by means of flexible drive 19.

The flexible drive 19 comprises a phospher bronze, helically wound spring with said brass bushes 22 and 22' at its opposite ends, which are clamped by means of screws 27 to the pointer shaft and thermometer stem 17 respectively. The slots 13 and 14 enable the stem to be disposed at any angle between 90° and 180° with respect to the pointer shaft 17b. The housings 11 and 12 are held in the desired orientation by three locking screws 23 which are tapped into one end of the inner housing 12 and which clamp a circular cover plate 24 to the housing 11.

The housing 11 is securely fixed to the body 25 of the thermometer and the assembly covered by a flexible rubber boot 26 that prevents the ingress of moisture or dust.

The assembly is preferably manufactured of stainless steel, but mild steel, brass or aluminium could be used.

In operation, rotation of the thermometer stem located within tubular member 16 will be transmitted, by means of spring 19, to pointer shaft 17b, which shaft is intended to carry a pointer which is rotated over a scale as a result of the rotation of the thermometer stem, transmitted by spring 19. In accordance with the aforedescribed construction, comprising co-axial cylindrical housing 11 and 12 provided with slots 13 and 14, respectively, the relative angular position between tubular member 16 (containing the thermometer stem) and pointer shaft 17b can be changed from approximately 90° to 180°. This is accomplished by swinging member 16 in a counterclockwise direction, within slot 13, viewing FIG. 1, such action causing inner housing 12 to rotate counterclockwise as made possible because of slot 14.

I claim:

1. In a rigid-stem dial gauge comprising a pointer shaft, a thermometer stem, a flexible drive member connecting said pointer shaft and said thermometer stem and a coupling assembly mounting said stem and said shaft, the improvement wherein said coupling assembly comprises an outer housing, an inner housing coaxially and rotatably mounted within the outer housing, said pointer shaft extending radially through aperture means in one of said housings and said thermometer stem extending radially through aperture means in the other of said housings, said two aperture means being in spaced relation, and an arcuate slot in each of said housings whereby the relative angular position of the housings about their common axis can be adjusted to change the angle between said stem and said shaft.

2. In a gauge as claimed in claim 1, said housings being cylindrical.

3. In a gauge as claimed in claim 1, a flexible cover of rubber or plastics material which surrounds the two housings to prevent the ingress of dirt or moisture.

* * * * *